United States Patent Office 3,536,468
Patented Oct. 27, 1970

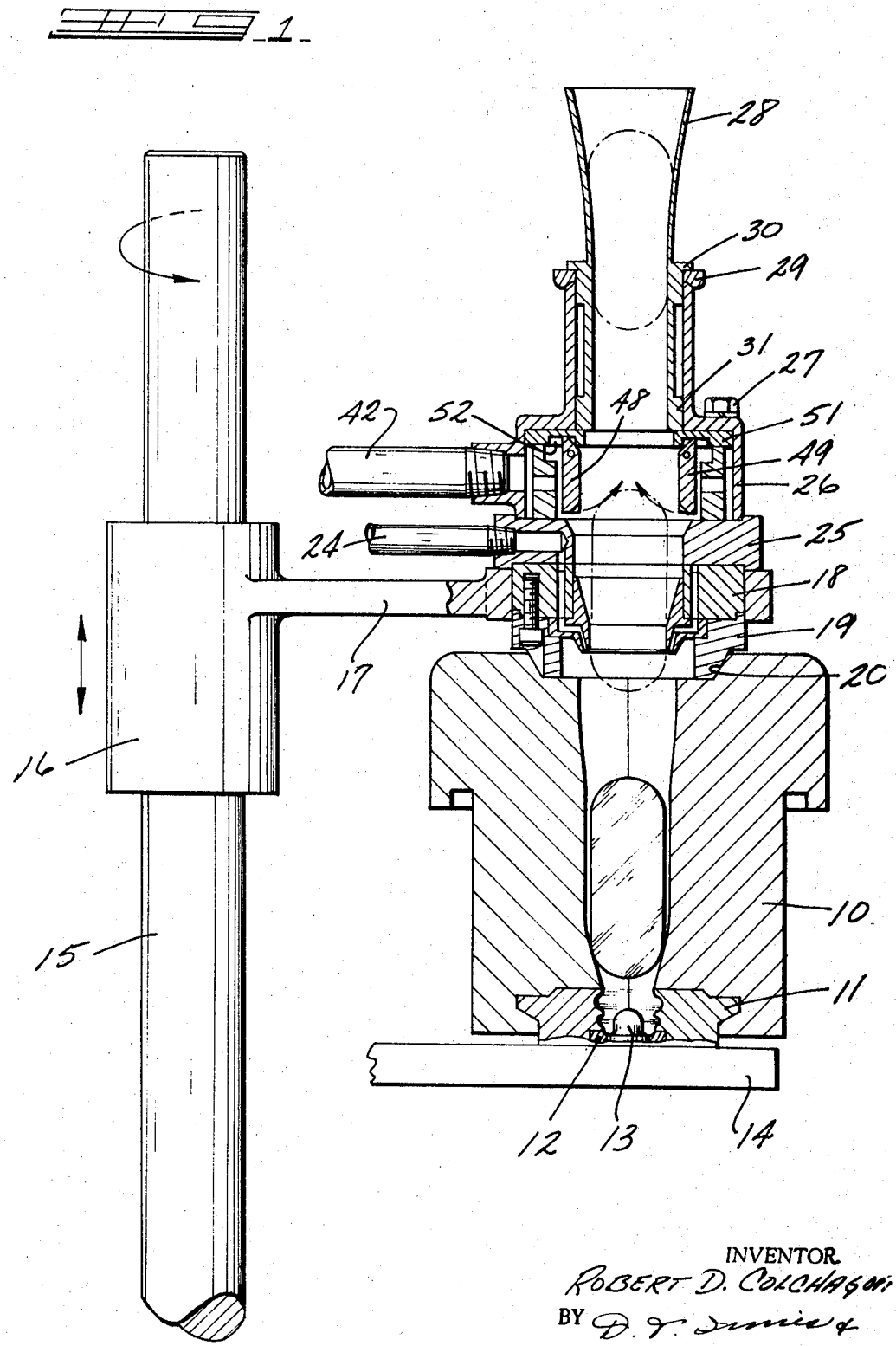

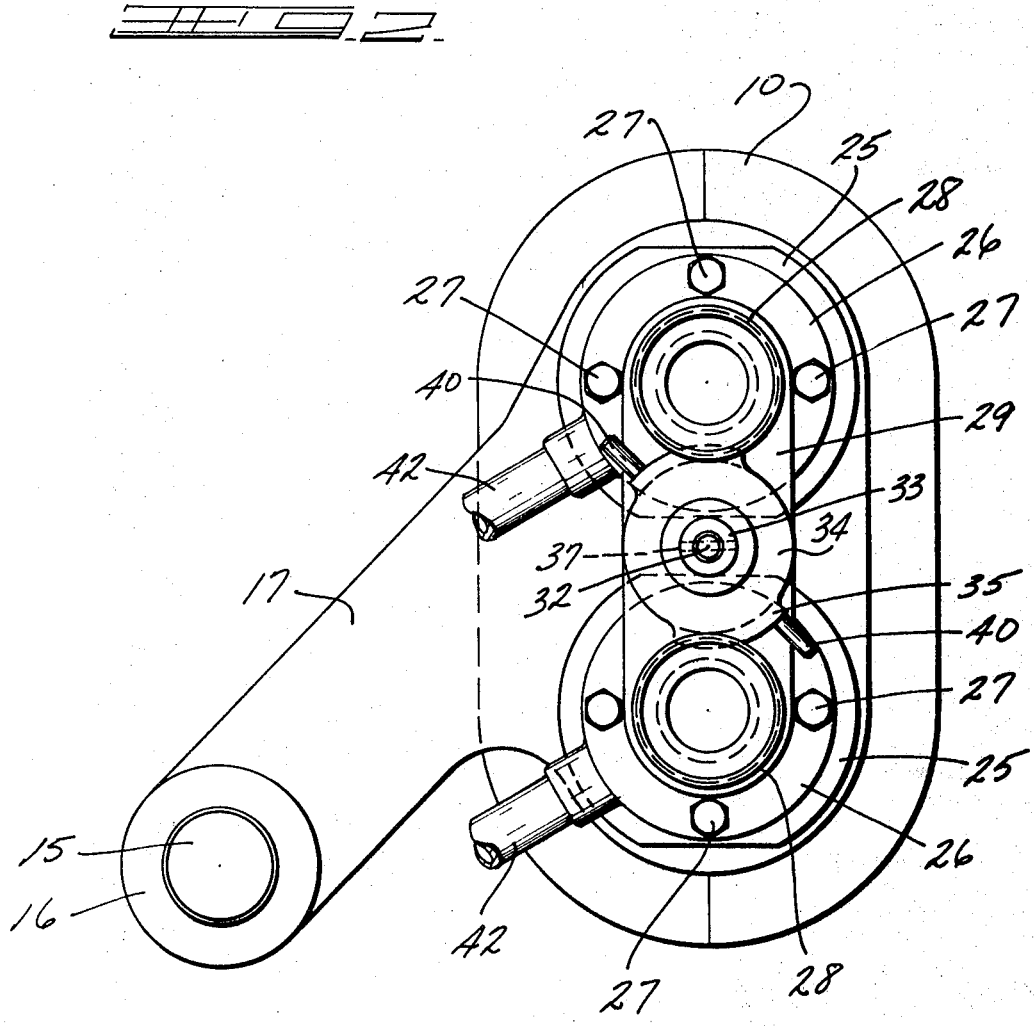

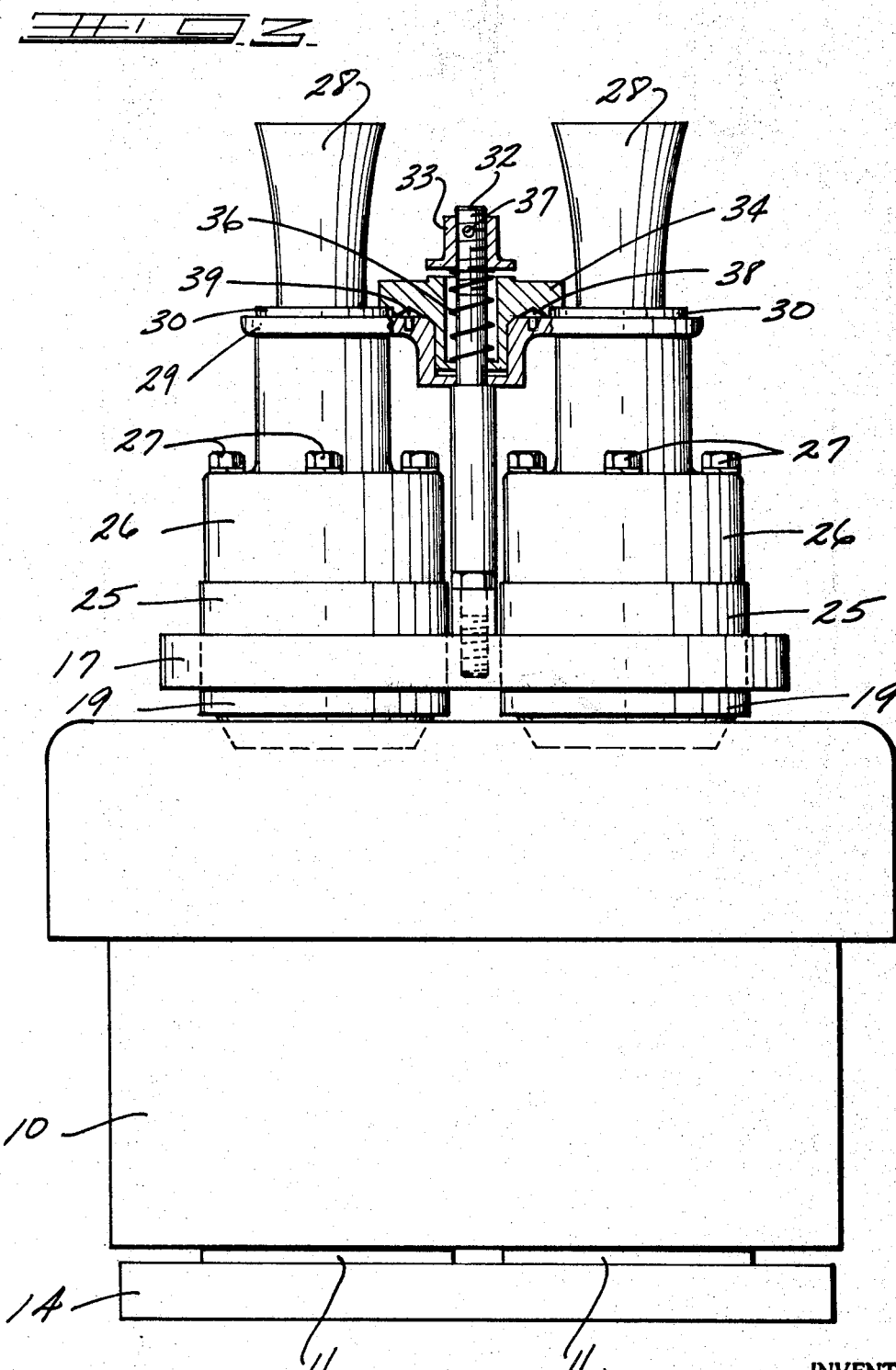

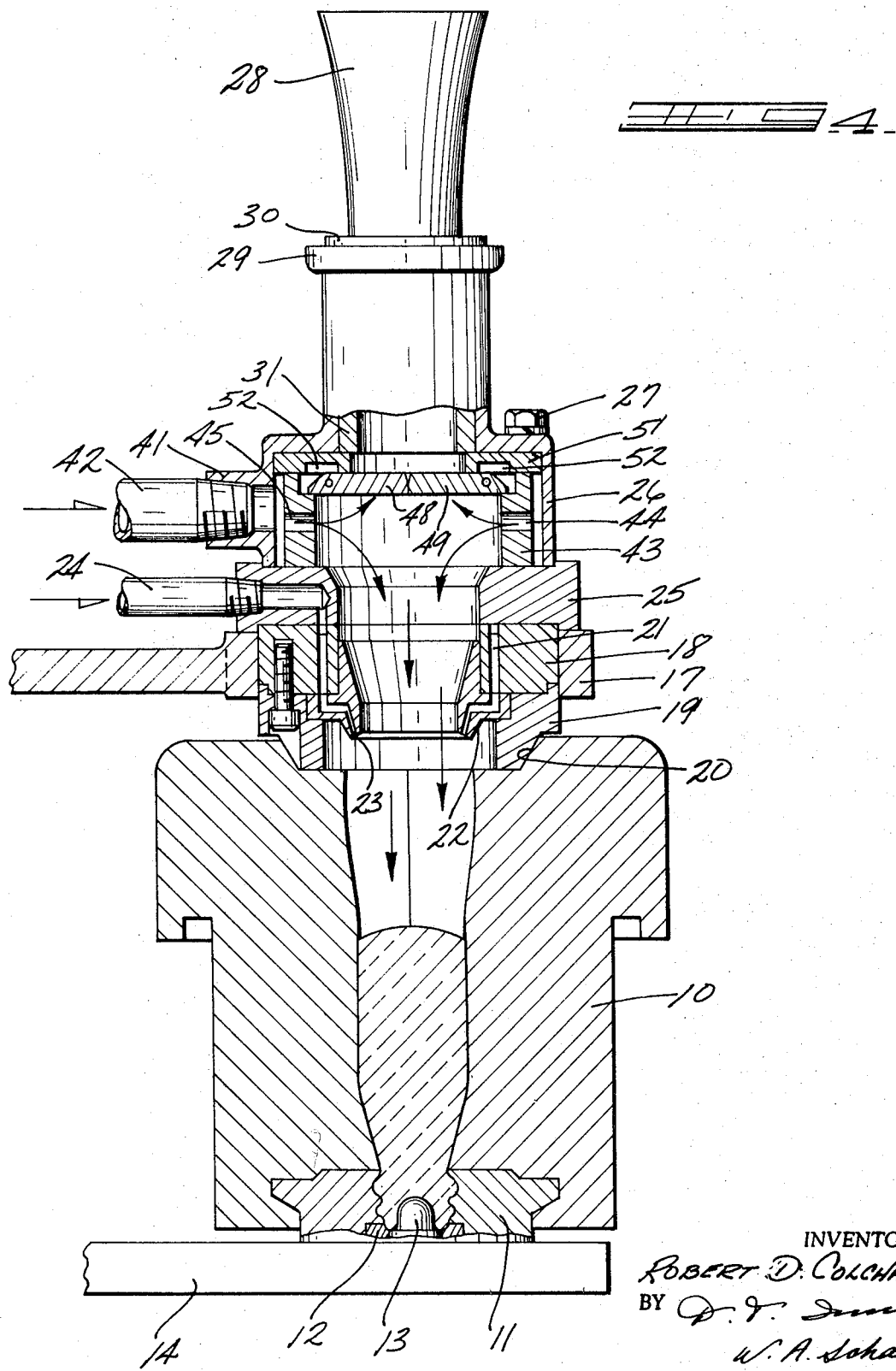

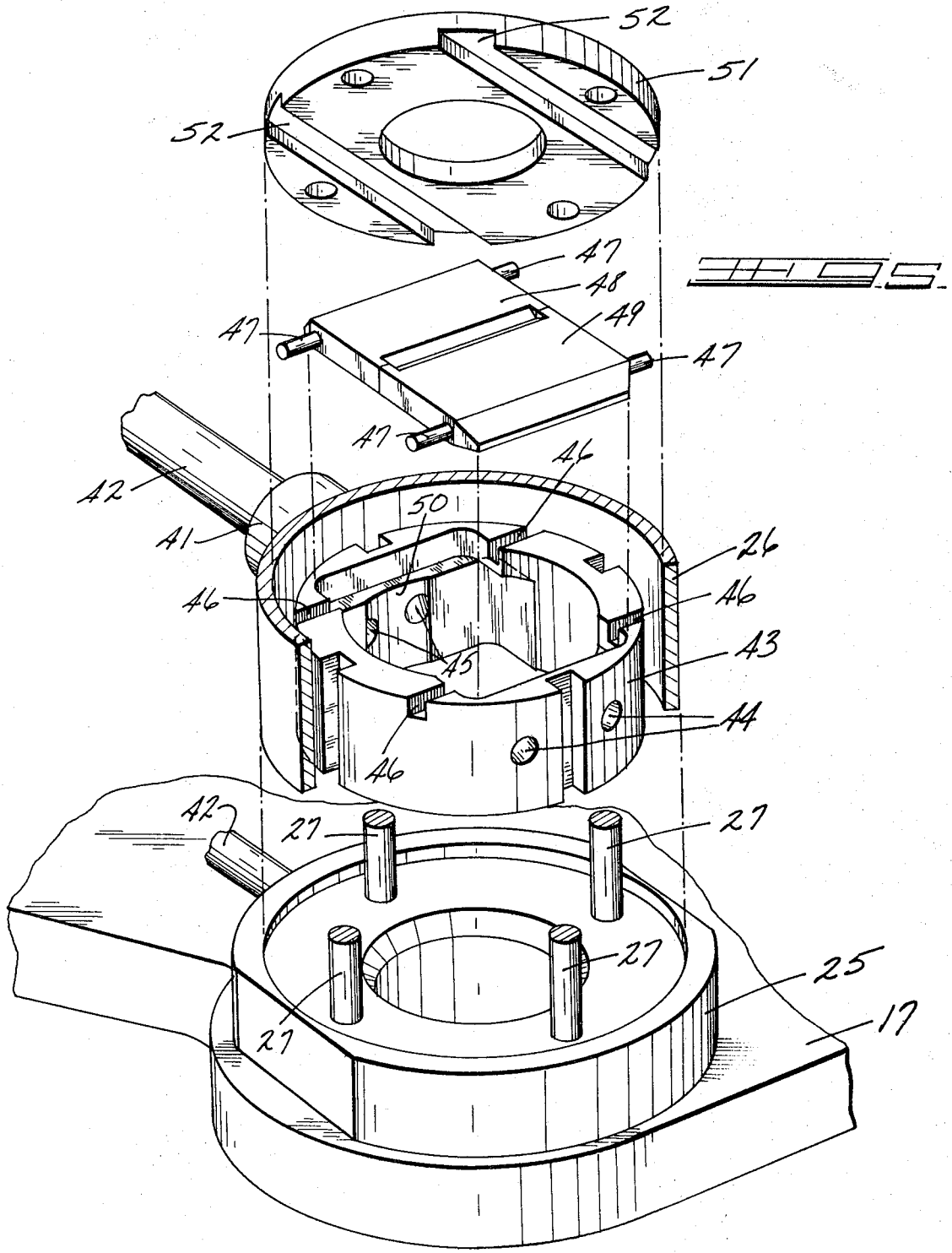

3,536,468
GLASS PARISON FORMING WITH SETTLE BLOW CLOSING MEANS
Robert D. Colchagoff, Toledo, Ohio, assignor to Owens-Illinois, Inc., a corporation of Ohio
Filed Dec. 14, 1967, Ser. No. 690,661
Int. Cl. C03b 5/30, 9/00
U.S. Cl. 65—208    5 Claims

ABSTRACT OF THE DISCLOSURE

In the forming of narrow-neck parisons by the process termed "I.S. blow and blow," the mold charges in the form of gobs are loaded into the parison mold which is in inverted position. Air under pressure is supplied so as to "settle blow" the mold charge into intimate engagement with the neck mold and neck forming pin closing the lower end of the parison mold. It is important when loading the parison molds with the mold charge, that the mold charge be delivered centrally of the mold. After the gob is loaded, it is advantageous to settle-blow the gob as quickly as possible so that the counter-blow may be made more quickly, this resulting parisons and containers will have less pronounced "settle wave."

The gob guiding mechanism of the present invention assures that the gob is centrally loaded in the mold, lubricated and the settle blow may be applied immediately upon the arrival of the gob in the mold by the arrangement of a valve mechanism of the swinging plate type incorporated in the structure of the gob guiding mechanism.

BACKGROUND OF THE INVENTION

This invention is directed to the loading and settle blowing of gobs in parison molds. It has been found that in order to prevent or to obviate the appearance of what is termed "settle wave" in the finally blown article, it is necessary to settle blow and counter-blow the parison fairly rapidly; otherwise, that portion of the glass which contacts the parison mold after loading and during settle blowing becomes chilled and during counter-blow may not move appreciably relative to the parison mold, with the parison mold continuing to extract heat from that portion of the glass which is in contact therewith.

When such a parison is blown in a blow mold or finish mold, the colder glass is not reheated by the internal heat within the body of the parison to the same extent as the less chilled skin of the parison; thus, the blown article will have a side wall configuration which is not uniform. In fact, that portion of the side wall which is formed from glass that is not reheated to the same temperature, therefore has a viscosity different from the other glass forming the parison and frequently leaves a thickened annular ring of glass extending around the blown container in the area between the bottom of the container and midway of its height. This annular, thicker area is what is termed "settle wave."

It has been the practice in the past in attempts to avoid production of ware having "settle waves" to speed up the entire forming cycle, particularly on the parison forming side. In forming a parison a certain amount of heat must be removed from the parison and a certain chill imparted to the skin of the parison in order for the parison to have sufficient rigidity to be successfully inverted and transferred on an I.S. type forming machine to which the present invention pertains.

The well-known Hartford I.S. forming machine is operated in a sequence wherein the mold charge, after loading, is settle blown by putting a settle blow head into engagement with the upper end of the parison mold. After the settle blow has been completed, the settle blow head must be removed and a baffle seated to close off the parison mold, after which the counter-blow is effected.

During this period the glass is contacting the parison mold, a chilled skin is being formed on the glass and the total heat content of the glass parison is being reduced. As previously stated, there is frequently a portion of the glass which contacts the mold surface that doesn't move after loading and settle blow and thus becomes cooler and more viscous than the rest of the body of the parison.

In order to speed up the cycle it has been proposed that the mold charge be "settled" around the neck pin and within the neck mold by utilization of a vacuum applied to this area. Theoretically, this would appear to be feasible; however, as a practical matter some problems have arisen mainly due to incomplete filling of the neck mold and the area about the neck pin. Also, the vacuum filling of the neck mold and about the neck pin is a technique which frequently results in an uneven glass distribution with respect to the upper part of the mold charge in contact with the mold wall so that upon retraction of the neck pin and the application of the counter-blow air, the hollowing of the mold charge into a parison will not occur symmetrically with respct to the mold cavity. Then the parison has unequal wall thickness areas and when it is expanded in the blow mold, the resultant blown article will also have unequal wall thickness distribution throughout the blown article.

SUMMARY OF INVENTION

This invention is directed to apparatus for loading and "settle-blowing" glass mold charges in parison molds wherein the mold charges are guided in the period of movement just prior to entry into the parison molds so that they are assured of being loaded centrally of, and symmetrically with respect to the vertical axis of the parison molds. Incorporated within the gob guiding mechanism, which is in registry with the mold, is a settle-blow valve and lubricant spray mechanism which permits spraying of the interior of the mold or exterior of the gob as it is loaded in the mold and immediate application of the settle-blow air without requiring the mechanical replacement of the gob guides with spray heads or settle-blow heads. Machine speeds are increased and better ware produced because of central gob loading, more consistent lubrication of blank molds and neck molds and the necks are formed quicker and more consistently.

BRIEF DESCRIPTION OF THE DRAWINGS

FIG. 1 is an elevational view of the unitary gob loading and settle blowing apparatus of the invention, partly in section;

FIG. 2 is a top plan view of the apparatus of FIG. 1;

FIG. 3 is a side elevational view of the apparatus of FIGS. 1 and 2;

FIG. 4 is an elevational view similar to FIG. 1 on an enlarged scale showing the settle-blow valve closed; and FIG. 5 is an exploded perspective view of the settle blow valve mechanism of the invention on an enlarged scale.

With particular reference to FIGS. 1–4, the detailed apparatus of the invention will be described in conjunction with the conventional parison forming molds of an I.S. machine.

A conventional blank or parison mold 10 supported by the usual mechanism (not shown) is of the split or two-piece type which is closed about the neck rings or molds 11. At the lower portion of the neck ring 11 there is provided a thimble 12 and centrally disposed within the thimble is a neck pin or plunger 13. The thimble 12, neck pin 13 and neck ring 11 are carried by an invert arm 14 of a conventional I.S. forming machine. For reference purposes, U.S. Pat. No. 1,911,119 of Ingle illustrates the mechanical arrangements of the I.S. machine.

Adjacent the parison mold there is provided a vertically extending post 15 with a collar or sleeve 16 telescoped thereon and fixed thereto. The collar or sleeve 16 has formed integrally therewith a funnel arm 17 which serves as the raising and lowering mechanism with respect to the gob guiding and settle-blow valve, later to be described.

The arm 17 at its extending end is provided with a pair of circular openings within which is seated a manifold ring 18. The manifold ring 18 has bolted to its under-surface a pilot ring 19 whose lower configuration is such that it will match the annular, tapered piloting surface 20 of the blank mold 10. The manifold ring 18 has a plurality of vertical passages 21 formed therein which extend throughout the full height of the ring and communicate at their lower ends with complementary openings formed in a spray ring 22.

As best shown in FIGS. 1 and 4, the spray ring 22 has an internal, annular surface which tapers inwardly and serves as a final guiding funnel for the gobs just prior to the movement of the gobs into the parison mold. This assures precise center loading or symmetrical loading of the gobs with respect to the parison mold cavity. The spray ring 22, as can best be viewed in FIGS. 1 and 4, has its passages arranged with outlet nozzle passages 23 directed downwardly and inwardly toward the inside of the parison mold cavity positioned therebelow.

Lubricant is supplied to the manifold ring 18 and to the spray ring 22 from a source (not shown) through a flexible pipe 24 connected to an opening in an annular base 25. The base 25 is mounted on the funnel arm in overlying relationship with respect to the manifold ring. The base 25 is provided with internal passages communicating with passages in the manifold ring. Thus it can be seen that mold lubricant supplied through the pipe 24, under predetermined pressure, will spray the interior of the parison mold and the neck mold. The sequence of operation or introduction of the lubricant may be timed such that the spray will impinge on the outside of the gob as it falls through the spray ring. The base 25 has a hollow cap 26 mounted thereon in axial alignment with the opening through the base 25. The cap is secured to the base by a series of screws 27. The upper portion of the cap is of somewhat smaller cross-sectional dimension than the lower portion, with the upper portion serving as a support for an annular gob guide 28.

The particular arrangement illustrated, is applied to what is termed "double gob" operation and, as best shown in FIGS. 2 and 3, the upper annular ends of the caps 26 have a yoke 29 resting thereon, with the gob guides 28 provided with radially extending annular flanges 30 which rest on the upper surfaces of the yoke 29. The lower end of the gob guides 28 are provided with annular, radially extended bosses 31 which closely fit within the interior of the upper portion of the cap 26. In this manner the gob guides are assured of being vertically mounted with their axes symmetrically arranged with respect to the vertical axis of the parison mold cavity.

A vertically extending stud 32 is fixed to the funnel arm 17 intermediate the two gob guides 28 and extends upwardly with its upper end passing through an opening in the yoke 29. The upper end of the stud 32 is threaded to receive a nut 33. An annular retainer 34 formed with radially extending camming portions 35 is biased downwardly by a spring 36 surrounding the stud 32 and confined between the retainer 34 and the nut 33. The nut 33 is spaced from the retainer 34 so as to permit some vertical movement of the retainer relative to the nut and yoke and the nut is fixed with respect to the stud 32 by a radial pin 37 which passes through an opening formed in the stud and the nut. The upper surface of the yoke 29 carries a pair of drive screws 38 whose heads extend above the surface of the yoke 29. The under-surface of the retainer 34 is provided with a pair of depressions 39 within which the heads of the drive screws 38 will fall when the retainer 34 is in its locking position. As shown in FIGS. 2 and 3, the camming portions 35 of the retainer 34 overlie the flange portions 30 of the gob guides 28 when in the locked position illustrated. The retainer 34 may be easily rotated about the axis of the stud 32 by the use of roll pins 40 which extend radially from the retainer 34. As can readily be seen, rotation of the retainer 34 by the roll pins 40 in a counter-clockwise direction, as viewed in FIG. 2, will cause the camming portions 35 to release the flanges 30 permitting easy and quick replacement of the gob guides, if found necessary.

Within the cap 26 a settle-blow valving arrangement is provided. This settle-blow valve is shown in exploded detail in FIG. 5. The cap 26 is provided with an internally threaded nipple 41 to which a threaded pipe 42 is attached. The pipe 42 in turn is connected to a source (not shown) of air or other suitable fluid under pressure. Symmetrically located within the lower portion of the cap 26 and having an external diameter less than the internal diameter of the cap 26 is a frame 43. The frame 43, as best shown in FIG. 5, is provided with vertical slots in its exterior surface which, on assembly, will cooperate with the screws 27 to serve to retain the frame centrally with respect to the interior of the cap 26 and prevent rotation of displacement of the frame relative to the cap. The space provided between the frame and the cap serves as a manifold passage for air or blowing fluid.

Pairs of substantially horizontal openings 44 and 45 are provided at diametrically opposed sides of the frame 43. The internal configuration of the frame 43 at the location where the pairs of openings 44 and 45 enter, present generally flat, vertical planes. The upper edge of the frame 43 is formed with opposed pairs of horizontal notches 46 which serve as bearings for hinge pins 47 carried by a pair of swing plates 48 and 49. With the swing plates 48 and 49 mounted within the frame 43 by their pins 47, the plates will hang vertically downward in the position shown in FIG. 1. The previously described vertical, planar surface formed on the inner faces of the frame 43 have centrally relieved portions 50 within which the inner ends of the openings 44 and 45 are located, thus providing a small chamber behind each of the swing plates 48 and 49.

A valve seat or plate 51 overlies the upper edge of the frame 43 and serves as a means for limiting the upward swing of the swing plates 48 and 49 to a horizontal position. As can be seen when viewing FIG. 5, the valve seat 51 is formed with horizontal notches 52 in the undersurface thereof, which provide clearance for the portions of the swing plates which extend upwardly beyond the hinge pin axes when the plates are in the vertical position, shown in FIG. 1. Introduction of air under pressure through the pipe 42 will cause air to enter the cap 26 in surrounding relationship with respect to the frame 43. The air will pass through the openings 44 and 45 to effectively swing the swing plates 48 and 49 into the closed position shown in FIG. 4. With the plates closed, the passage of air upwardly from the interior of the frame 43 is substantially prevented. The air, therefore, will pass downward through the spray ring and to the top of the mold charge to effectively settle blow the mold charge into the neck mold and about the neck pin, as shown in FIG. 4. When the air supply is shut off or discontinued, the swing plates will swing back to their original position under the influence of gravity. In this manner the application of the settle blow air and the settle blowing of the mold charge is effected after a much shorter interval following the loading of the gob than is presently capable of being carried out where it is now necessary to replace the gob guides with a blow head over the top of the parison mold. With quicker settle blow, the mold charge is in contact with the mold for a lesser period of time and with the removal of the unitary gob guide and settle-blow valve through the vertical reciprocation and turning of the post 15, placement of the counter-blow baffle may be effected at an earlier point in time so that counter-blow of the parison may be accomplished more quickly. All of the increased speed with respect to the final forming of the parison contributes to the later forming of the blown container having a less pronounced "settle-wave."

While the foregoing detailed description has been directed to double-gob operation, it should be abundantly clear that the principle of the invention, the unitary gob guide, mold spray and "settle" blow valve would have equal application to the loading of a single gob and its subsequent formation into a parison.

Other and further modifications may be resorted to without departing from the spirit and scope of the appended claims.

I claim:

1. Apparatus for loading and settle-blowing glass gobs in parison molds comprising, in combination a parison mold having an open upper end and gob guiding and centering means above and in alignment with upper end of said parison mold, said gob guiding and centering means comprising a generally cylindrical gob guide for receiving and centering gobs in relation to the parison mold cavity, a valve chamber interposed between said gob guide and parison mold, normally open valve means in said valve chamber permitting the fall of gobs therethrough, and means connected to said valve chamber for introducing settle-blow air under pressure to said valve chamber below said valve means for closing said valve means to restrict flow of air to said gob guide thereby forcing air under pressure into the parison mold for settling the gob therein.

2. Apparatus as defined in claim 1, further including an annular ring interposed said valve chamber and said parison mold, said ring having an inwardly tapered frusto-conical surface adapted to guide a gob in a vertical path, said ring formed with a lower edge with passage means formed in said ring and terminating at said lower edge in a plurality of circumferential openings and means connected to said ring for periodically supplying lubricant to said passages in said ring.

3. Apparatus as defined in claim 1, wherein said valve means comprises a pair of plates pivotally mounted in said valve chamber and normally opened by the force of gravity, said plates being adapted to pivot into co-planar relationship upon introduction of said settle-blow air to said chamber whereby the passage between said chamber and said gob guide is closed.

4. Apparatus as defined in claim 1 wherein said valve means comprises a plate pivotally mounted in said valve chamber and normally opened by the force of gravity, said plate being adapted to pivot into the passage between said chamber and said gob guide to close said passage upon introduction of said settle-blow air into said chamber.

5. Apparatus as defined in claim 3 wherein the means for introducing air under pressure includes openings for directing air horizontally against each of said plates to lift the plates into passage closing position.

References Cited
UNITED STATES PATENTS

| | | | |
|---|---|---|---|
| 1,148,701 | 8/1915 | Mackin | 65—234 |
| 1,182,448 | 5/1916 | Bingham | 65—240 XR |
| 2,081,858 | 5/1937 | Howard | 65—234 |
| 3,171,728 | 3/1965 | Andersen | 65—208 XR |
| 3,357,810 | 12/1967 | Crouse | 65—234 |

FRANK W. MIGA, Primary Examiner

U.S. Cl. X.R.

65—233, 234, 242, 262, 263